United States Patent [19]

Shimano

[11] 4,331,043
[45] May 25, 1982

[54] GEAR CRANK FOR A BICYCLE

[75] Inventor: Keizo Shimano, Sakai, Japan

[73] Assignee: Shimano Industrial Company, Limited, Osaka, Japan

[21] Appl. No.: 143,364

[22] Filed: Apr. 24, 1980

[30] Foreign Application Priority Data

May 10, 1979 [JP] Japan .............................. 54-62627[U]
Jul. 23, 1979 [JP] Japan .............................. 54-102172[U]

[51] Int. Cl.³ .............................................. G05G 1/14
[52] U.S. Cl. ................................................... 74/594.2
[58] Field of Search ............................ 74/594.1, 594.2

[56] References Cited

U.S. PATENT DOCUMENTS 596,550  1/1898  Siglow ............................... 74/594.2
3,347,112 10/1967 Thun ................................. 74/594.2

FOREIGN PATENT DOCUMENTS 89799    of 0000  Fed. Rep. of Germany .
318003   of 0000  France .
2416829  10/1979  France ............................... 74/594.1
11545    of 1895  United Kingdom ............... 74/594.2
29485    of 1896  United Kingdom ............... 74/594.1

*Primary Examiner*—Kenneth Dorner
*Attorney, Agent, or Firm*—Stevens, Davis, Miller & Mosher

[57] ABSTRACT

A gear crank for a bicycle, comprising a crank shaft, a pair of crank arms, and a chain gear has crank arm mounting portions at both axial ends of the crank shaft provided with supports having round outer peripheral surfaces and, axes offset with respect to the axis of rotation of the crank shaft respectively. The crank arms are removably mounted to the supports to allow for a changing of the angular position of the crank arms relative to the supports, whereby the angular positions are changed to adjust the length between the axis of rotation of the crank shaft and the utmost end of each crank arm.

2 Claims, 13 Drawing Figures

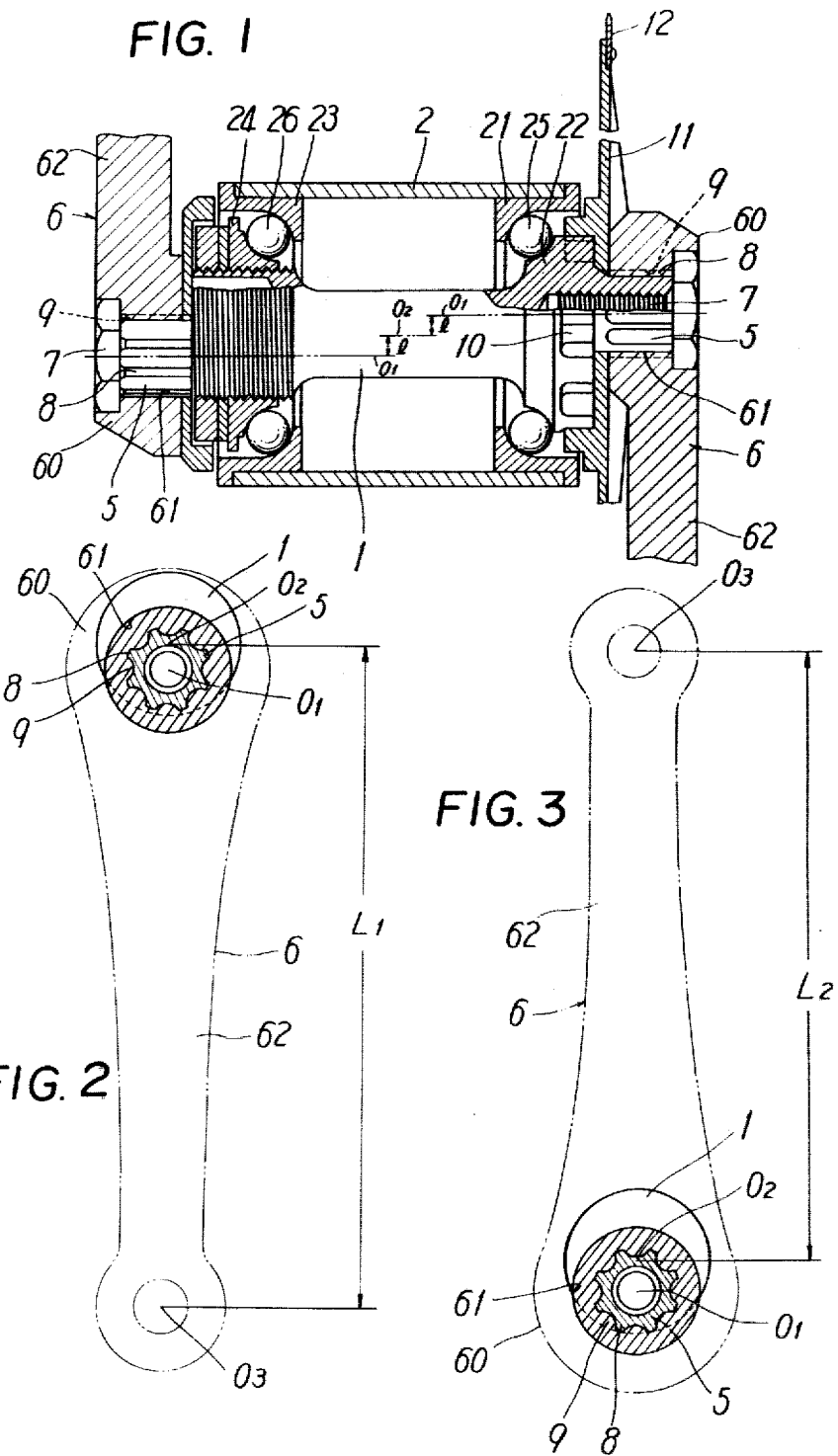

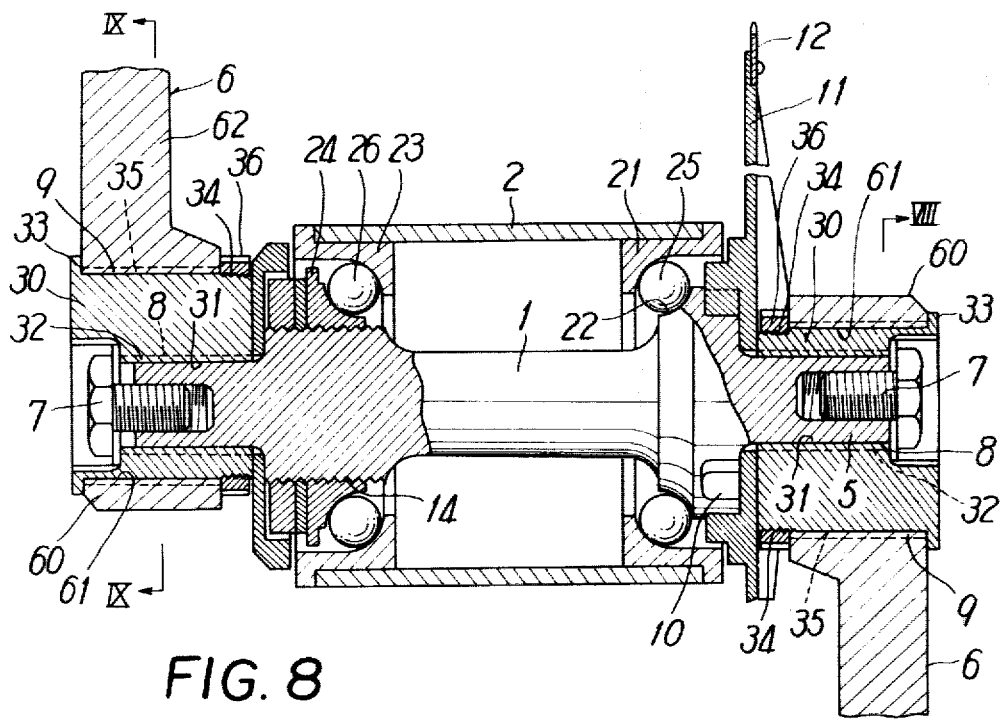
FIG. 7
FIG. 8
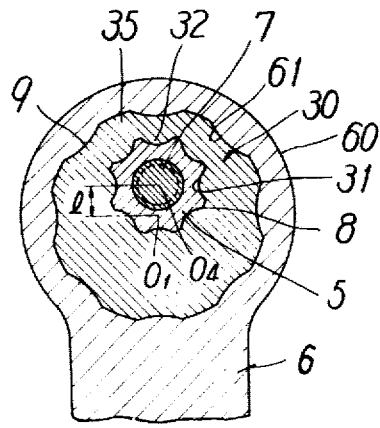
FIG. 9
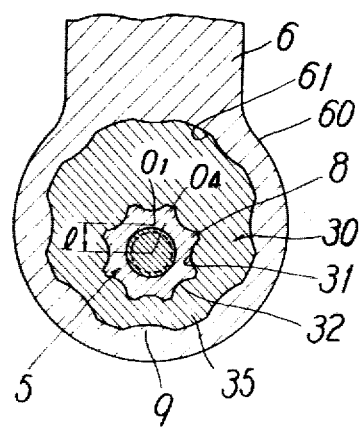

GEAR CRANK FOR A BICYCLE

FIELD OF THE INVENTION

This invention relates to a gear crank for a bicycle, and more particularly to a bicycle gear crank which comprises a crank shaft, a pair of crank arms supported at both axial ends of the crank shaft, and a chain gear mounted on one axial side of the crank shaft. The crank arms carry at their foremost ends of arm bodies pedals suppoted thereto through pedal shafts respectively.

BACKGROUND OF THE INVENTION

Generally, a racing bicycle has a changeable length between the axis of a crank shaft and that of a pedal shaft which is adjusted to the physical strength of the legs of a driver. A bicycle for ordinary use also has this length changeable according to the size of the bicycle.

A conventional bicycle gear crank has a support for each crank arm, which is disposed coaxially with the axis of rotation of the crank shaft. Hence, various crank arms of different lengths must be prepared to change the length between the axis of rotation of the crank shaft and the axis of the pedal shaft.

The preparation of various crank arms not only increases the number of parts and complicates supervision thereof but also the crank arms must be exchanged to the length between the crank shaft and the pedal, which is inconvenient for users.

SUMMARY OF THE INVENTION

This invention has been designed to overcome the above problems. An object of the invention is to provide a gear crank for a bicycle, which is capable of desirably adjusting the effective length between the axis of rotation of the crank shaft and the axis of the pedal shaft and providing for any required length by the preparation of a few kinds of crank arms.

This invention, has been designed to adjust the length between the utmost end of each crank arm and the axis of rotation of the crank shaft in such a manner that the axis of the round outer peripheral portion of a support for each crank arm is radially offset from the axis of rotation of the crank shaft, and each crank arm is supported to the support in a relation of being changeable angularly in different directions, so that each crank arm may have its angular position relative to the crank shaft adjusted for length adjustment between the pedal and crank shaft axes.

In the present invention, the support may have a round outer peripheral surface and be integral with the crank shaft. Or, the support may include a portion integral with the crank shaft and a tubular mounting members separate from the crank shaft and mounted on both axial ends of the crank shaft at the crank arm supporting portions thereof. In either case, the axis of the support is offset radially from the axis of rotation of the crank shaft. The respective crank arms have at a boss thereof a bore fit onto the outer peripheral surface of the support. Between each bore and each support is provided coupling means through which the boss is changeable in its circumferentialy fitting position with respect to the support. The coupling means changes the fitting position to adjust the length between the utmost end of the crank arm and the axis of rotation of the crank shaft.

Accordingly, the present invention need not require preparation of many crank arms of different lengths as conventional, as it is sufficient to use a pair of mounting members to permit ready removal and adjustment of the crank arm, thereby reducing the number of parts and facilitating supervision thereof. Furthermore, the length between the axis of the crank shaft and the utmost end of each crank arm, is simply and easily changed without exchanging crank arms.

Further objects and advantages of the present invention will be apparent from the following description, reference being had to the accompanying drawings wherein a preferred form of the present invention is clearly shown.

BRIEF DESCRIPTION OF THE DRAWINGS

FIG. 1 is a partially sectional view of an embodiment of a gear crank of the invention, FIGS. 2 and 3 are side views showing the mounting of a crank arm on a support at a crank shaft, FIG. 7 is a longitudinal front view of another modified embodiment of the invention, FIG. 8 is a sectional view taken on the line VIII—VIII in FIG. 1, FIG. 9 is a sectional view taken on the line IX—IX in FIG. 1, FIGS. 10 and 11 are side views showing the mounting of the crank arm in the embodiment in FIG. 7, on the crank shaft through a crank arm mounting member, FIGS. 12 and 13 show still another embodiment of the invention, in which FIG. 12 is a section view thereof, and FIG. 13 is a perspective view of the crank arm mounting member.

DETAILED DESCRIPTION OF THE INVENTION

Figure 4:
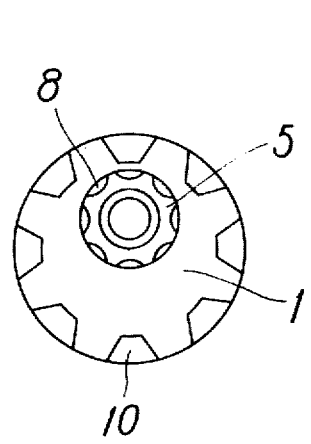
FIG. 4 is a right side view of the crank shaft only.

At first, a typical embodiment of the invention will be described in accordance with FIGS. 1 through 3, in which:

Reference numeral 1 designates a crank shaft, which is supported rotatably to a tubular bottom bracket 2 at the bicycle frame through balls 25 and 26 interposed between a ball race 21 at the bracket 2 and a ball race 22 at the crank shaft 1 and between a ball race 23 at the bracket 2 and a ball holder 24 screwed with the crank shaft 1.

At both aixal ends of the crank shaft 1 are provided supports 5 which project integrally therewith and have round outer peripheral surfaces for carrying thereon crank arms 6 respectively. The supports 5 are radially offset at the axes $O_1$ thereof by length 1 from the axis $O_2$ of rotation of crank shaft 1 respectively, and are provided at the outer peripheral surfaces with a plurality of ridges extending axially and spaced circumferentially at regular intervals.

The crank arms 6 each comprise a boss 60 having an insertion bore 61 fit on the support 5 and an arm body 62 extending in one direction from the boss 60. A pedal (not shown) is mounted on the utmost end of each arm body 62 through a pedal shaft (not shown). Reference $O_3$ in FIGS. 2 and 3 represents the axis of the pedal shaft.

At the inner peripheral surface of each bore 61 are provided a plurality of ridges 9 in mesh with the ridges 8 at the outer peripheral surface of each support 5, so that the ridges 9 mesh with those 8 to support the crank arms 6 onto the support 5 such that they are changeable angularly in different directions.

In the embodiment shown in the drawings, at both axial ends of the crank shaft 1 are provided threaded bores coaxial with the supports 5, and headed bolts 7 screwed with the bores from the outside of each crank arm 6 to thereby fix the crank arms 6 to the crank shaft 1. This fixing method is well-known, and bolts 7 may be replaced by nuts, with screw threads being provided at the outer peripheral surfaces of supports 5.

Figure 6:
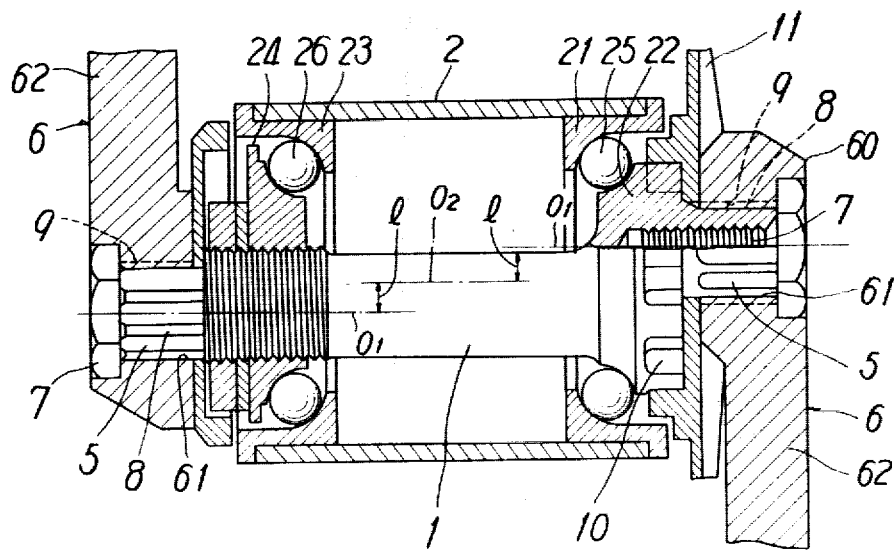
FIG. 6 is a sectional view of a modified embodiment of the invention, corresponding to FIG. 1.

There are two methods of offsetting the axis $O_1$ of each support 5 from the axis $O_2$ of rotation of crank arm 1. The first method is that the crank shaft 1, as shown in FIG. 1, is disposed coaxially with the bottom bracket 2, the ball race 22 at the crank shaft 1 and ball holder 24 screwed therewith are disposed coaxially with the crank shaft 1 and, in turn the bottom bracket 2, so that the axis of crank shaft 1 may coincide with the axis of rotation thereof, and the supports 5 are shifted from each other at an angular phase of 180° with respect to the crank shaft 1 and are radially offset by length l from the axis of crank arm 1. The second method is that the crank shaft 1, as shown in FIG. 6, is radially deviated by the aforesaid length l from the axis of bottom bracket 2, so that the axis of crank shaft 1 deviates from the axis of revolution thereof, one support 5 is disposed coaxially with the crank shaft 1, and the other support 5 is radially offset at the axis $O_1$ thereof by length 2l from the axis of crank shaft 1 or by length l from the axis $O_2$ of revolution of crank shaft 1.

A chain gear 12 is mounted at one axial side of the crank shaft 1 in such a manner that the crank shaft 1, as shown in FIG. 1, is provided at the outer peripheral surface of one axial end with a plurality of ridges extending axially of the crank shaft 1 so as to form a chain gear mounting portion 10 coaxial with the axis $O_2$ of rotation of crank shaft 1, and an adapter 11 is fit onto the mounting portion 10 and fixed through the crank arm 6 and tightened by the bolt 7, so that the chain gear 12 may be mounted on the outer periphery of adapter 11. Alternatively, the chain gear 12 may be mounted on the axially inner end of support 5 at one axial end of the crank arm 1.

Figure 5:
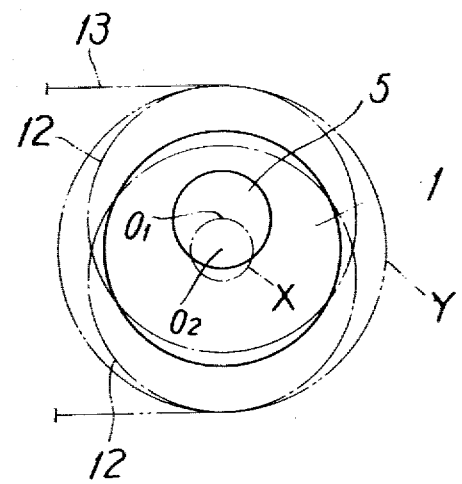
FIG. 5 shows the revolution of the locus of a chain gear mounted on the support.

In this instance, the axis $O_1$ of support 5, as shown in FIG. 5, revolves in a round locus X around the axis $O_2$ of rotation of crank shaft 1 following revolution of the crank arm 6, at which time, the chain gear 12 mounted on the support 5 circles in the round locus X while rotating, whereby the peripheral teeth of gear 12 describe a round locus Y larger in diameter than the round locus X. Hence, a driving chain 13 carried by the gear 12 travels on the locus Y of larger diameter, thereby increasing the driving force from the chain 13 and obtaining a speed-up effect for the bicycle.

The coupling means comprising the ridges 8 and 9 is used to change the position where the insertion bore 61 of each crank arm 6 is fit onto the support 5, thereby changing the crank arm 6 angularly in different directions, in which the changeable angular positions of crank arm 6 correspond to the number of ridges 8 and 9 which mesh with each other.

The change of fitting position of the boss 60 of each crank arm 6 onto the support 5 is carried out in such a manner that the headed bolts 7 are removed, the crank arms 6 are drawn off the supports 5, and thereafter the bosses 60 of crank arms 6 are circumferentially angularly turned and again fit onto the supports 5 at desired angular positions respectively. After changing the position, the bolts 7 are tightened to fix the crank arms 6 to the crank shaft 1.

When the respective crank arms 6, as shown in FIG. 2, are supported to the support 5 in the direction of an extension line from the axis $O_2$ of rotation of crank shaft 1 to the axis $O_1$ of support 5, i.e., downwardly in FIG. 2, then the length $L_1$ between the axis $O_2$ and the axis $O_3$ of the pedal shaft at the end of crank arm 6 becomes a maximum.

On the other hand, when the crank arms 6, as shown in FIG. 3, are supported in the direction of an extension line from the axis $O_1$ to $O_2$, i.e., upwardly in FIG. 3, length $L_2$ between the axes $O_2$ and $O_3$ becomes a minimum. In brief, the length $L_2$ is equal to $L_1$ minus 2l, where l is the above described offset amount.

Thus, each of the crank arms 6 can have its mounting angle changed with respect to the straight line connecting the axes $O_1$ and $O_2$, whereby the effective length of the crank arm 6 between the axis $O_2$ of rotation thereof and that $O_3$ of the pedal shaft is changeable in a plurality of stages.

As seen from the above, the supports 5 in the aforesaid embodiment are integral with the crank shaft 1 and are offset at the axes $O_1$ of the round peripheral surfaces from the axis $O_2$ of rotation of crank shaft 1. Alternatively, mounting members 30, as shown in FIGS. 7 through 9, separate from the crank shaft 1 may be used as crank arm supports, in place of the supports 5, for forming the round outer peripheral surfaces having thereof offset from the axis of crank shaft 1.

The mounting members 30 are column-like shaped, and are provided at the radially central portions thereof with bores 31 which can mate with the supports 5 coaxial with the crank shaft 1, each of the bores 31 deviating by a length l from the axis $O_1$ of mounting member 30. At the inner peripheral surface of each bore 31 are formed ridges 32 to mate with the ridges 8 at the support 5, so that the respective mounting members 30 may be fit non-rotatably with respect to the crank shaft 1. The axis of the round outer peripheral surface at each mounting member 30 is offset by a length l from the axis $O_2$ of rotation of crank shaft 1.

As seen from the above, the mounting members 30 are used to form the round outer peripheral gear crank support surfaces like the supports 5 integral with the crank shaft 1 of the previous embodiments, whereby the embodiment in FIGS. 7 through 9 is not essentially different from the embodiments of FIGS. 1 through 6.

Accordingly, components in FIGS. 7 through 13 indentical with those in FIGS. 1 through 6 are represented by the same reference numerals.

The ridge 32 at the insertion bore 31 of the respective mounting members 30 and those 8 at the respective supports 5, constitute a second coupling means. The respective mounting members 30 are provided at the outer periphery of one axial end with a flange 33, at the outer periphery of the other axial end with a screw thread 34, and at the outer periphery of an axially intermediate portion with ridges 35 to mate with the ridges 9 at the insertion bore 61 at the boss 60 of a crank arm 6, the ridges 35 and those 9 forming a first coupling means to connect the crank arm 6 with the mounting member 30. The screw thread 34 screws with a nut 36 having at its outer periphery a rotary control element, through which the crank arm 6 is fixed to the mounting member 30.

Figure 12:
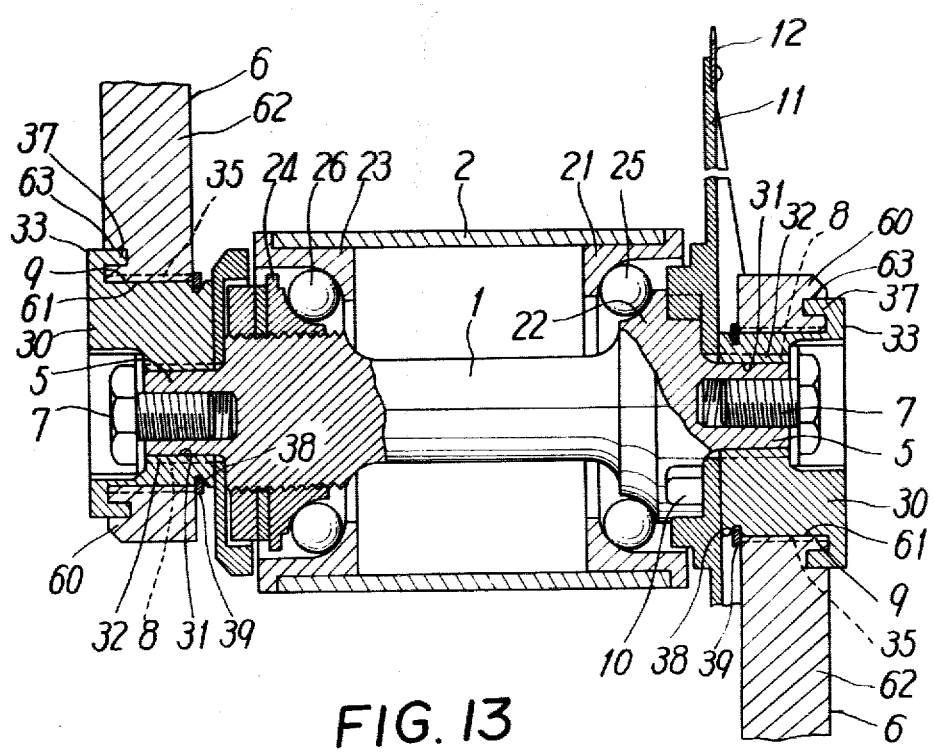
Figure 13:
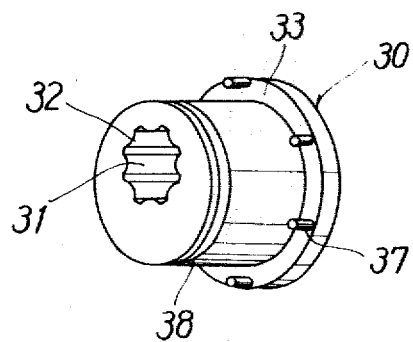

Alternatively, the aforesaid first coupling means, as shown in FIGS. 12 and 13, may be formed in such a manner that each of the mounting members 30 has a round outer peripheral surface, the flange 33 has a plurality of projections 37, and a plurality of receiving bores 63 are formed at the boss 60 of each crank arm 6 and around the bore 61 thereof.

Also, the screw thread 34 provided at the mounting member 30 may be replaced by an annular groove 38, into which a C-like shaped ring 39 is inserted to fix the crank arm 6 to the mounting member 30.

As seen from the above, when the crank arm 6 is mounted on the crank shaft 1 through the mounting member 30, the length between the axis $O_3$ of pedal shaft at the utmost end of a crank arm 6 and the axis $O_2$ of rotation of crank shaft 1 is changeable as in the former embodiments.

Figure 10:
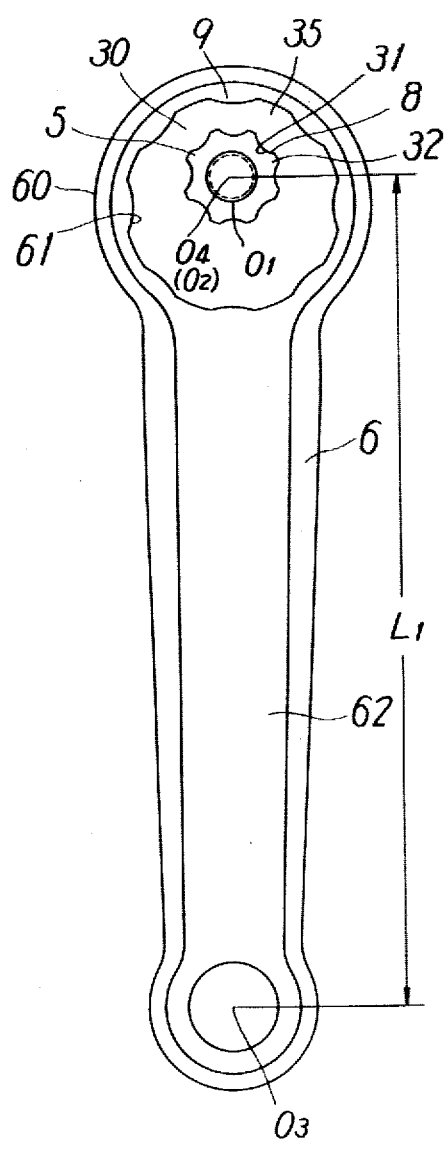

When the crank arm 6, as shown in FIG. 10, is mounted in the direction of an extension line from the axis $O_4$ of support 5, that is, the axis $O_2$ of rotation of crank shaft 1, toward the axis $O_1$ of mounting member 30, in other words, downwardly in FIG. 10, the length $L_1$ between the axes $O_2$ and $O_3$ becomes a maximum.

Figure 11:
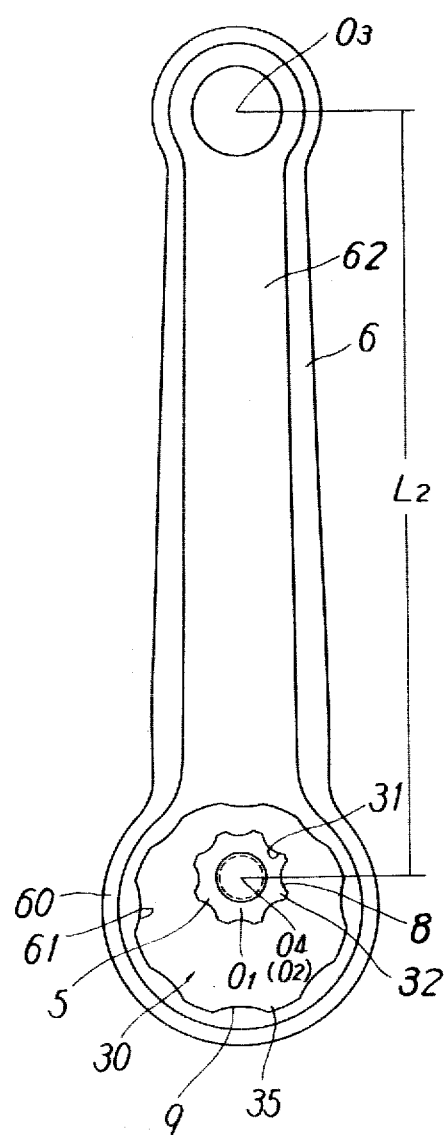

On the other hand, when the crank arm 6, as shown in FIG. 11, is mounted in the direction of an extension line from the axis $O_1$ of mounting member 30 to the axis $O_2$ of rotation of crank shaft 1, in other words, upwardly in FIG. 11, the length $L_2$ between the axis $O_2$ and the axis $O_3$ of pedal shaft becomes a minimum. In brief, the length $L_2$, as in the former embodiments, is equal to the length $L_1$ minus 2l, where l is the amount of shift from $O_1$ to $O_2$.

Each crank arm 6 has a changeable mounting angle with respect to the straight line connecting the axes $O_1$ and $O_2$, so that effective length of each crank arm 6 between the axis $O_2$ of rotation of crank shaft 1 and the axis $O_3$ of the pedal shaft, may be changed in a plurality of stages as in the former embodiments.

In addition, for changing the length between the axes $O_2$ and $O_3$, the mounting member 30 may have its position changed to mate with the crank shaft 1, or the crank arm 6 may be changed in its mating position with respect to the mounting member 30.

As clearly understood from the aforesaid description, the gear crank of the invention is so constructed that the support for each crank arm has an axis offset from the axis of rotation or revolution of the crank shaft and each crank arm is supported to the support in a manner which permits a change in its mating position therewith. Hence, the crank arms are mounted on the supports in a relation of being each changeable at an angle with respect to the support, whereby the effective length of each crank arm between the axis of rotation or revolution of the crank shaft and the axis of the pedal shaft is adjustable. As a result, conventional crank arms of various length need not be prepared, but preparation of a few kinds of crank arms which are capable of changing the effective length are only required, thereby minimizing problems with supervision or other handling of the crank arm.

As many apparently widely different embodiments of this invention may be made without departing from the spirit and scope thereof, it is understood that the invention is not limited to the specific embodiments described above but only by the appended claims.

What is claimed is:

1. A gear crank for a bicycle, comprising a crank shaft, a pair of crank arms supported at opposite axial ends of said crank shaft, a chain gear mounting portion coaxial with the axis of said crank shaft and formed at one axial end of said crank shaft, the outer diameter of said chain gear mounting portion being larger than that of said crank shaft, a chain gear mounted on said chain gear mounting portion, said crank shaft having at opposite axial ends thereof integral supports having round outer peripheries for respectively supporting said crank arms, said supports having respective axes offset from the axis of rotation of said crank shaft, said crank arms comprising bosses having insertion bores which fit onto said supports and arm bodies extending in one direction from said bosses respectively, said gear crank further comprising a spline coupling provided between the inner peripheral surface of said insertion bore at each of said bosses and outer peripheral surface of each of said supports for coupling each of said crank arms to said crank shaft at a prescribed angular position with respect to said crank shaft, said spline coupling permitting said insertion bore to be changeable in its position on said support to thereby adjust the length between the axis of said crank shaft and the utmost end of said arm body of each of said crank arms, means for preventing relative rotation between said chain gear and crank shaft, and means for fixing said crank arms to said crank shaft, said chain gear being sandwiched between one of said crank arms and said chain gear mounting portion by said fixing means.

2. A gear crank for a bicycle according to claim 1, wherein said rotation preventing means comprises a plurality of ridges provided on the outer periphery of said chain mounting portion and extending axially of said crankshaft which engage with complementary surfaces of a means for supporting said chain gear.

* * * * *